United States Patent
Raghu et al.

(10) Patent No.: US 10,152,638 B2
(45) Date of Patent: *Dec. 11, 2018

(54) EARLY DETECTION OF EXIT ONLY AND SHARED LANES USING PERCEPTION TECHNOLOGY

(71) Applicants: VOLKSWAGEN AG, Wolfsburg (DE); AUDI AG, Ingolstadt (DE)

(72) Inventors: Kaushik Raghu, Redwood City, CA (US); Mohammadhossein Daraei, Mountain View, CA (US); Premkumar Natarajan, Belmont, CA (US); Norman Lopez, Hayward, CA (US)

(73) Assignees: Volkswagen AG (DE); Audi AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,795

(22) Filed: Jun. 20, 2018

(65) Prior Publication Data

US 2018/0300559 A1 Oct. 18, 2018

Related U.S. Application Data

(62) Division of application No. 14/579,144, filed on Dec. 22, 2014, now Pat. No. 10,025,996.

(51) Int. Cl.
*B60R 11/04* (2006.01)
*G06K 9/00* (2006.01)
(Continued)

(52) U.S. Cl.
CPC ... *G06K 9/00798* (2013.01); *B60W 30/18154* (2013.01); *B60W 30/18163* (2013.01);
(Continued)

(58) Field of Classification Search
None
See application file for complete search history.

(56) References Cited

U.S. PATENT DOCUMENTS

| 4,970,653 A | 11/1990 | Kenue |
| 2009/0157286 A1 | 6/2009 | Saito |

(Continued)

FOREIGN PATENT DOCUMENTS

DE 102004060432 A1 8/2006

OTHER PUBLICATIONS

Manual on Uniform Traffic Control Devices for Streets and Highways, 2009 Edition, US Department of Transportation Federal Highway Administration, Chapter 2E and 3, p. i81-236, p. 347-432, May 2012 (Year: 2012).*

(Continued)

*Primary Examiner* — Janese Duley
(74) *Attorney, Agent, or Firm* — Barnes & Thornburg LLP

(57) ABSTRACT

An in-vehicle system for identifying exit-only lanes and shared exit lanes on a roadway having a first camera for obtaining image data regarding lane markings on the roadway, a second camera for obtaining image data regarding exit signs, a lane marking detection module for detecting lane markings on the roadway, an exit sign detection module for detecting exit signs, and an exit sign analyzer for detecting arrows on the detected exit signs. The in-vehicle system categorizes detected lane markings as one of standard frequency dashed lane markings, high frequency dashed lane markings, and solid lane markings, and identifies an exit-only lane and a shared exit lane in response to the categorizations of the detected lane markings and characteristics of the detected arrows.

10 Claims, 13 Drawing Sheets

(51) Int. Cl.
*G06K 9/46* (2006.01)
*G06K 9/40* (2006.01)
*B60W 30/18* (2012.01)

(52) U.S. Cl.
CPC ........... *G06K 9/00818* (2013.01); *G06K 9/40* (2013.01); *G06K 9/4652* (2013.01); *B60W 2420/42* (2013.01); *B60W 2550/141* (2013.01); *B60W 2550/22* (2013.01); *B60W 2550/402* (2013.01)

(56) References Cited

U.S. PATENT DOCUMENTS

| | | | |
|---|---|---|---|
| 2010/0328316 A1* | 12/2010 | Stroila | G06K 9/00818 |
| | | | 345/441 |
| 2012/0271510 A1 | 10/2012 | Seymour | |
| 2013/0049988 A1 | 2/2013 | Roeber et al. | |
| 2013/0101174 A1 | 4/2013 | Meis et al. | |
| 2013/0208945 A1* | 8/2013 | Nunn | G06K 9/00798 |
| | | | 382/103 |
| 2014/0156134 A1 | 6/2014 | Cullinane et al. | |
| 2014/0156182 A1* | 6/2014 | Nemec | G05D 1/021 |
| | | | 701/430 |
| 2015/0094898 A1 | 4/2015 | Tellis | |
| 2015/0253142 A1 | 9/2015 | Kornhauser et al. | |
| 2016/0252363 A1 | 9/2016 | Tertoolen | |
| 2017/0076598 A1 | 3/2017 | Scofield | |

OTHER PUBLICATIONS

Hold et al.; ELA—an Exit Lane Assistant for Adaptive Cruise Control and Navigation Systems; 2010; 13th International IEEE Annual Conference on Intelligent Transportation Systems; Sep. 19-22, 2010.

Manual on Uniform Traffic Control Devices for Streets and Highways; 2009 Edition; US Department of Transportation Federal Highway Administration; Chapters 2E and 3; pp. 181-236 and 347-432.

Office Action from U.S. Appl. No. 14/520,804; dated Dec. 31, 2015.

\* cited by examiner

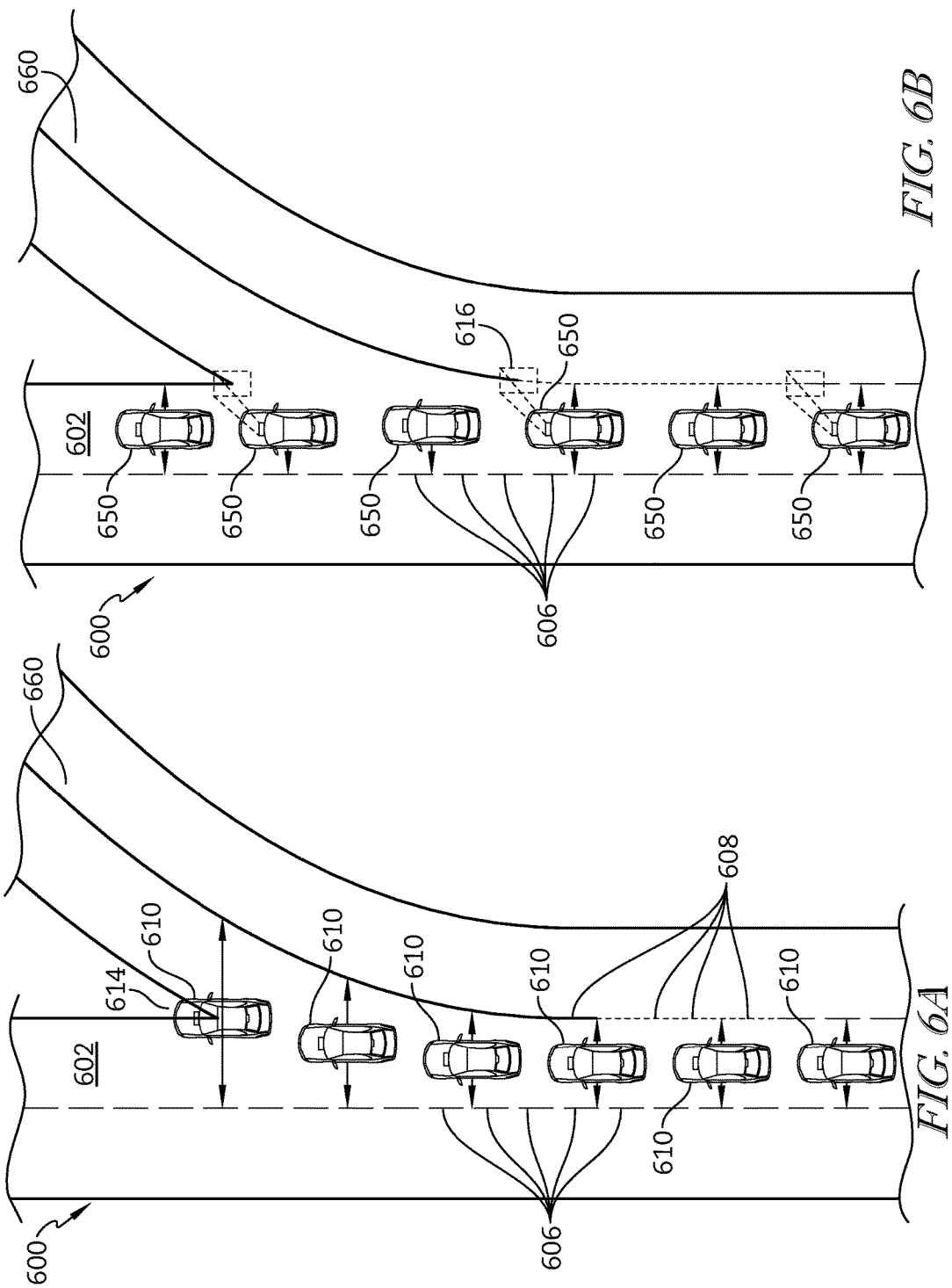

EARLY DETECTION OF EXIT ONLY AND SHARED LANES USING PERCEPTION TECHNOLOGY

CROSS REFERENCE TO RELATED APPLICATION

This patent application is a divisional of co-pending U.S. patent application Ser. No. 14/579,144, filed 22 Dec. 2014, entitled EARLY DETECTION OF EXIT ONLY AND SHARED LANES USING PERCEPTION TECHNOLOGY, the disclosure of which is incorporated herein by reference in its entirety.

BACKGROUND

The present disclosure relates to systems, components, and methodologies for determining a position of a vehicle. In particular, the present disclosure relates to systems, components, and methodologies that improve determinations of a position of a vehicle on a roadway having exits.

SUMMARY

According to the present disclosure, systems, components, and methodologies are provided for determining a position of a vehicle on a roadway having exits.

In illustrative embodiments, an in-vehicle lane identification system detects lane markings to identify exit-only lanes on a roadway. The lane identification system detects lane markings that are characteristic of exit-only lanes, such as dashed lane markings with relatively short and frequent dashes, or solid lane markings. The lane identification system factors the side of the vehicle on which the characteristic lane markings are detected to determine whether the presently occupied lane of the vehicle is an exit-only lane, or whether a neighboring lane is an exit-only lane.

In other illustrative embodiments, an in-vehicle lane identification system uses roadway exit signs to identify exit-only lanes and shared exit lanes on a roadway. The lane identification system detects characteristics of the roadway exit signs, such as text written on the roadway exit signs or arrows displayed on the roadway exit signs, to identify exit-only lanes. The lane identification system also detects additional characteristics of the roadway exit signs, such as the number, color, or orientation of arrows displayed on the roadway exit signs, to identify shared exit lanes. The lane identification system may factor information about the side of a vehicle on which characteristic lane markings are detected to determine which lane on the roadway is an exit-only lane and which lane on the roadway is a shared exit lane.

In certain illustrative embodiments, detection of lane markings and detection of roadway exit signs may be alternative methodologies for identifying exit-only or shared exit lanes. In other embodiments, these two types of detection may operate in concert, with results of one type of detection verifying or adding more information to the other.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 6A shows a vehicle in a shared exit lane having an autonomous driving system that is not equipped with a lane identification system in accordance with the present disclosure, and suggests that the autonomous driving system erroneously seeks to center the vehicle between left side and right side lane markings, resulting in a potential collision;

FIG. 6B shows a vehicle in a shared exit lane having an autonomous driving system similar to that of FIG. 6A, except that the vehicle depicted in FIG. 6B is equipped with a lane identification system in accordance with the present disclosure, and suggests that the lane identification system averts a collision by causing the autonomous driving system to ignore right side lane markings of the shared exit lane until passage of an exit;

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
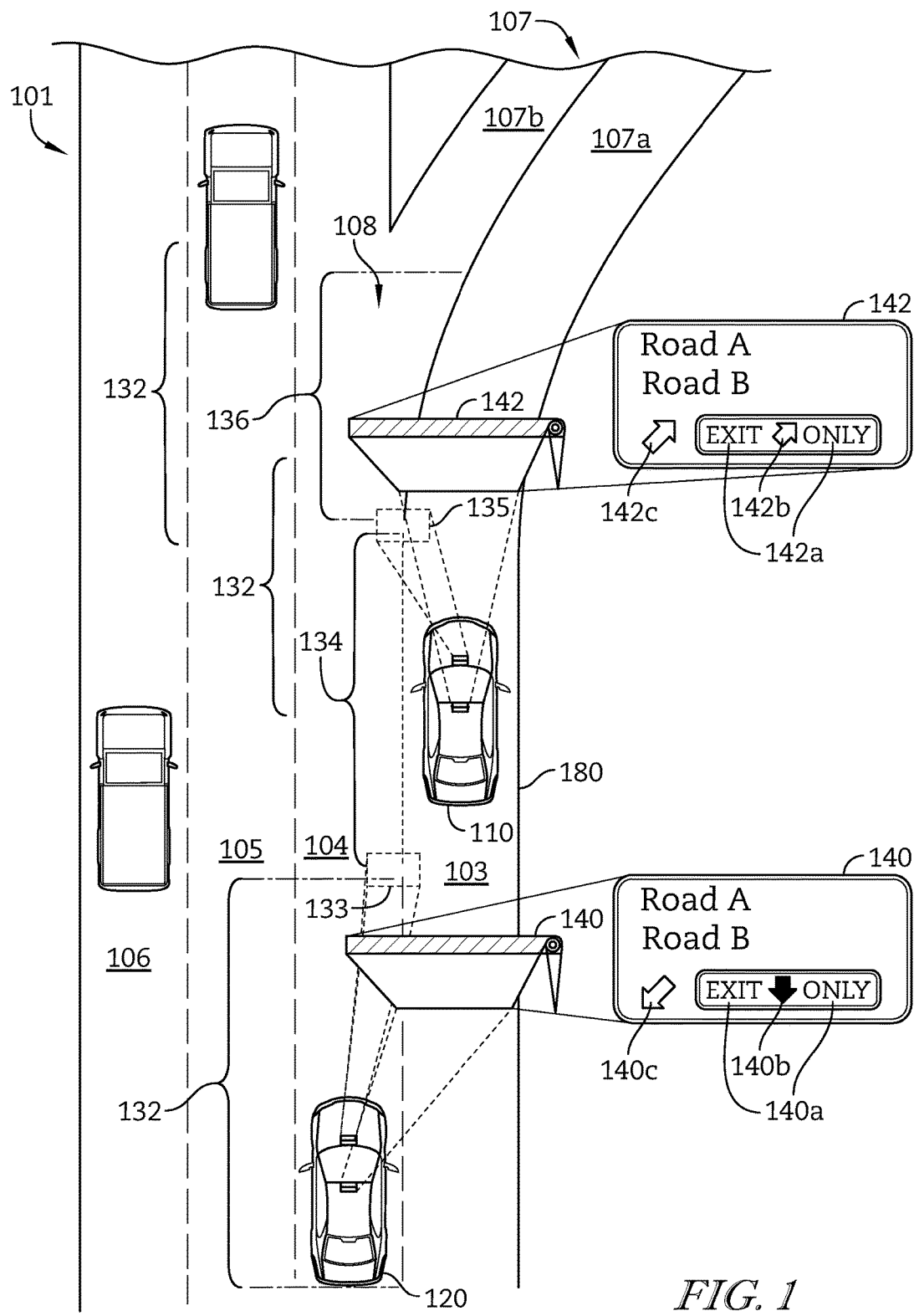
FIG. 1 shows vehicles equipped with lane identification systems in accordance with the present disclosure driving on a roadway having standard lanes, a shared exit lane, and an exit-only lane, and suggests that the lane identification systems are identifying exit-only and shared exit lanes by detecting exit signs and detecting lane marking characteristic of exit-only and shared exit lanes, including high frequency lane markings and solid lane markings.

An overview of systems, components, and methodologies in accordance with the present disclosure will be provided with reference to FIG. 1. FIG. 1 shows a first vehicle 110 and a second vehicle 120 driving on a roadway 101. Roadway 101 includes lanes 103, 104, 105, and 106, and an exit 107. Lanes 105 and 106 are standard lanes that follow trajectories along roadway 101 without departing via exit 107. Lane 104 is a shared exit lane, in that vehicles occupying lane 104 have an option at a branch location 108 to either continue on lane 104 as it follows a trajectory along roadway 101, or to take exit 107 by merging into lane 107b of exit 107. Finally, lane 103 is an exit-only lane. A vehicle occupying lane 103 would take exit 107 without having the opportunity to merge back onto roadway 101, because lane 103 merges into lane 107a of exit 107. In this illustrative example, first vehicle 110 occupies exit-only lane 103, and second vehicle 120 occupies shared exit lane 104.

First vehicle 110 and second vehicle 120 each include a lane identification system 200 that identifies the presence and location of exit-only lanes and shared exit lanes, and whose components and implementation will be described in further detail in connection with FIG. 2. Lane identification system 200 may identify exit-only lanes by detecting lane markings on roadway 101 characteristic of exit-only lanes, and by identifying characteristics of exit signs indicating the presence of exit-only lanes. Lane identification system 200 may identify shared exit lanes by identifying characteristics of exit signs indicating the existence of shared exit lanes. Moreover, lane identification system 200 may determine the location of both exit-only lanes and shared exit lanes by factoring the side of vehicle 110, 120 on which characteristic lane markings are detected.

Lane identification system 200 collects and analyzes data regarding lane markings on roadway 101 to identify the presence and location of exit-only lanes. Lane markings on the roadway 101 may fall into categories, including standard frequency lane markings 132, high frequency lane markings 134, and solid lane markings 136. Generally, standard frequency lane markings 132 may delineate lanes that proceed on roadway 101 without departing via exit 107. In this illustration, lanes 105 and 106 are delineated by standard frequency lane markings 132. High frequency lane markings 134 may be used to signify the existence of exit-only lanes. In this illustration, high frequency lane markings 134 signify that lane 103 is exit-only. Solid lane markings 136 may delineate exiting lanes when an exit is impending. In this illustration, solid lane markings 136 delineate lanes 107a and 107b of exit 107.

Lane identification system 200 categorizes different types of lane markings 132, 134, 136 to detect exit-only lanes, shared exit lanes, and impending exits. For example, when lane identification system 200 detects a transition from standard frequency lane markings 132 to high frequency lane markings 134, lane identification system 200 determines that an exit-only lane is present. In this illustration, lane identification system 200 of vehicle 120 detects a transition 133 between standard frequency lane markings 132 and high frequency lane markings 134. Accordingly, lane identification system 200 of vehicle 120 determines that an exit-only lane is present. Similarly, lane identification system 200 for vehicle 110 detects a transition 135 between high frequency lane markings 134 and solid lane markings 136. Accordingly, lane identification system 200 of vehicle 110 determines that exit 107 is imminent.

In addition to detecting the presence of exit-only lanes, lane identification system 200 also uses detection of lane markings 132, 134, 136 to determine the location of exit-only lanes. In this illustration, exit 107 is on a right side of roadway 101. Accordingly, lane identification system 200 concludes that exit-only lanes will be on the right side of roadway 101. When high frequency lane markings 134 are detected on a right side of a vehicle 110, 120, lane identification system 200 determines that a neighboring right lane is exit-only, as this would be the conclusion consistent with exit-only lanes being on the right side of roadway 101. However, when high frequency lane markings 134 are detected on a left side of a vehicle 110, 120, lane identification system 200 determines that a presently occupied lane is exit-only, as this would be the conclusion consistent with exit-only lanes being on the right side of roadway 101. As will be explained, lane identification system 200 may apply alternative logic in situations where exit 107 is on a left side of roadway 101.

In the illustration of FIG. 1, lane identification system 200 of vehicle 120 detects high frequency lane markings 134 on a right side of vehicle 120, and thus determines that neighboring right lane 103 is exit-only. In contrast, lane identification system 200 of vehicle 110 detects high frequency lane markings 134 on a left side of vehicle 110, so lane identification system 200 determines that presently occupied lane 103 is exit-only.

Lane identification system 200 also uses the data collected regarding exit signs 140, 142 to identify exit-only and shared exit lanes. For roadways that include multiple exit lanes, exit signs 140, 142, may include multiple arrows representing respective exit lanes, and each arrow may present different characteristics depending on whether a corresponding exit lane is exit-only or shared. In certain roadway environments, for example, arrows representing exit-only lanes are colored black and may be located near text indicating that a corresponding lane is exit-only. Arrows representing shared exit lanes may instead be colored white, and may not be located near text indicating that a corresponding lane is exit-only. Moreover, the orientation of arrows may vary depending on whether an exit will be some distance ahead, or whether an exit is impending.

In the example of FIG. 1, arrows 140*b*, 142*b* correspond to lane 103. Arrow 140*b* is colored black, and arrows 140*b*, 142*b* are located near "EXIT ONLY" text 140*a*, 142*a*, which suggests that lane 103 is exit-only. Arrows 140*c*, 142*c* correspond to lane 104. Arrow 140*c* is colored white, and arrows 140*c*, 142*c* are located remote from "EXIT ONLY" text 140*a*, 142*a*, which suggest that lane 104 is shared. Moreover, arrows 140*b*, 140*c* are oriented generally downwards, while arrows 142*b*, 142*c* are oriented generally upwards. This indicates that when a vehicle is near exit sign 140, an exit is still a certain distance away, but when a vehicle is near exit sign 142, an exit is impending. As will be explained in more detail, lane identification system 200 analyzes such characteristics of arrows 140*b*, 142*b*, 140*c*, 142*c* to detect the presence of exit-only lanes, shared exit lanes, and exits.

In addition to detecting the presence of shared exit lanes, lane identification system 200 may also determine the location of shared exit lanes. In the example of FIG. 1, exit 107 is on a right side of roadway 101. As previously explained, lane identification system 200 concludes that exit-only lanes will be on the right side of roadway 101. As a result, to the extent there are shared exit lanes, such shared exit lanes would be to the left of exit-only lanes. When lane identification system 200 concludes that a shared exit lane exists (e.g., based on analysis of exit signs), and lane identification system 200 detects high frequency lane markings 134 on a left side of a vehicle 110, 120, lane identification system 200 determines that a presently occupied lane is exit-only lane and a neighboring left lane is shared. This conclusion is consistent with shared exit lanes being to the left of exit-only lanes. When high frequency lane markings 134 are detected on a right side of a vehicle 110, 120, lane identification system 200 determines that a neighboring right lane is exit-only lane, and a presently occupied lane is shared. This conclusion is also consistent with shared exit lanes being to the left of exit-only lanes. As will be explained below, lane identification system 200 may apply alternative logic in situations where exit 107 is on a left side of roadway 101.

In the illustration of FIG. 1, lane identification system 200 of vehicle 120 determines the presence of a shared exit lane through detection and analysis of characteristics of arrows 140*c*, 142*c*, as summarized above. Because lane identification system 200 of vehicle 120 detects high frequency lane markings 134 on a right side of vehicle 120, it concludes that neighboring right lane 103 is exit-only while presently occupied lane 104 is shared. Lane identification system 200 of vehicle 110 also detects the presence of a shared exit lane through its detection and analysis of characteristics of arrows 140*c*, 142*c*. Because lane identification system 200 of vehicle 110 detects high frequency lane markings 134 on a left side of vehicle 110, it concludes that presently occupied lane 103 is exit-only whereas neighboring left lane 104 is shared.

As summarized above, lane identification systems in accordance with the present disclosure provide a technical solution to the problem of providing accurate and timely identifications of exit-only and shared lanes, including the relative position of exit-only and shared lanes. Such precise and timely identifications are beneficial for several reasons.

In one respect, lane identification system 200 may improve performance by allowing a vehicle in an exit-only or shared exit lane to timely modify an autonomous driving mode. Vehicles 110, 120 may have an autonomous driving system 208 (shown in FIG. 2) that may be programmed with different profiles or modes suitable for different respective driving conditions, including profiles for ordinary highway driving, highway driving where an exit is nearby, exit-only lane driving, shared exit lane driving, ramp driving, or others. Autonomous driving system 208 may use a less conservative profile for ordinary highway driving, a more conservative profile where an exit is nearby, a still more conservative profile when driving on an exit-only lane, etc. By providing accurate and timely identifications of exit-only and shared exit lanes, lane identification system 200 enables vehicles 110, 120 to timely and reliably switch to a driving profile suitable for use in present driving conditions.

Alternatively, lane identification system 200 may allow vehicles 110, 120 to notify drivers that vehicles 110, 120 are in exit-only or shared exit lanes, and provide drivers an opportunity to assume control of vehicles 110, 120. A driver may want autonomous driving system 208 to operate when vehicles 110, 120 are following a trajectory on roadway 101, but may wish to assume control of a vehicle 110, 120 on exit 107. Thus, it may be beneficial for vehicles 110, 120 to issue notifications to drivers that they are in exit-only or shared exit lanes, and allow drivers to assume control of vehicles 110, 120. If a driver intends to take exit 107, the driver can navigate vehicles 110, 120 through exit 107. If a driver does not intend to take exit 107, the driver can merge out of lane 103 (an exit-only lane) or lane 104 (a shared exit lane) and at a later time, when desired, reengage autonomous driving.

In another respect, lane identification system 200 may improve performance of autonomous driving system 208. Autonomous driving system 208 may navigate a vehicle based on navigation input from navigation system 206 (shown in FIG. 2). Navigation system 206 may provide directional instructions to autonomous driving system 208, including when autonomous driving system 208 should stay on roadways or take exits. Accordingly, autonomous driving system 208 would benefit from timely and accurate indications of whether it is in exit-only or shared exit lanes, so that autonomous driving system 208 can accurately and reliably follow instructions from navigation system 206 to take exits or to avoid exits.

In still another respect, lane identification system 200 may improve performance of autonomous driving system 208 for the specific circumstance in which a vehicle 120 is operating in a shared exit lane, such as lane 104. Ordinarily, an autonomous driving system may seek to center a vehicle between lane markings delineating the boundaries of the presently occupied lane. As will be discussed in more detail in connection with FIGS. 6A-B, such a methodology may be inadequate and dangerous for a vehicle occupying a shared exit lane. Timely and accurate detection of shared exit lanes can help autonomous driving systems use an alternate methodology suitable for shared exit lanes.

While vehicles 110, 120 may have certain native technology providing location resolution, such native technology may be unable to identify and locate exit-only and shared exit lanes. For example, GPS may not have sufficient spatial resolution to distinguish between exit-only or shared exit lanes, and there may not be a mapping application available on vehicles 110, 120 that included pre-programmed information on which specific highway lanes in a geographic locale are exit-only lanes or shared exit lanes.

Figure 2:
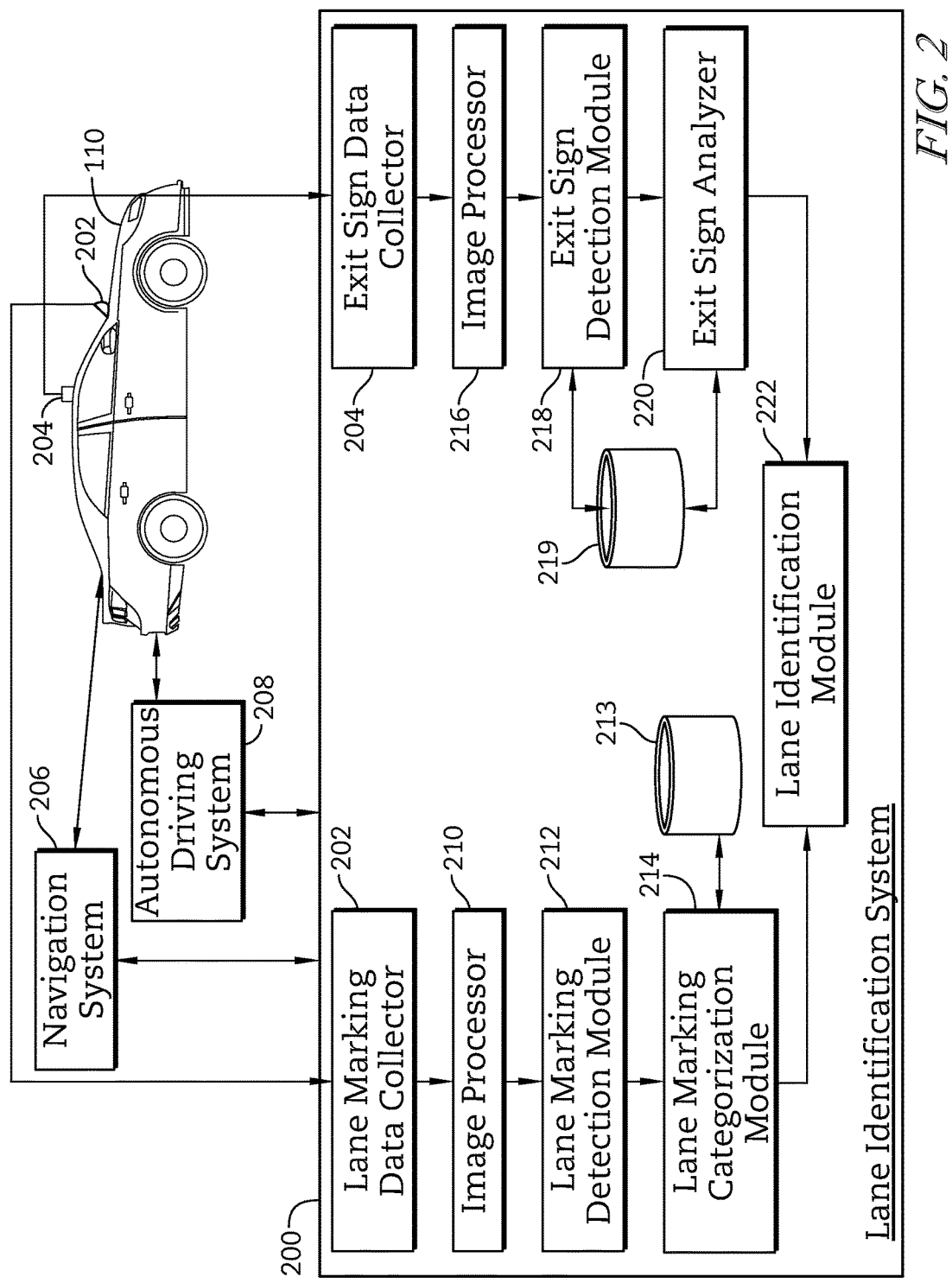
FIG. 2 is a diagrammatic view of a lane identification system in accordance with the present disclosure that includes one or more data collectors configured to collect lane marking and exit sign data, one or more image processors configured to process data collected by the one or more data collectors, a lane marking detection module configured to detect lane markings on a roadway, a lane marking categorization module configured to categorize detected lane markings as standard frequency, high frequency, or solid lane markings, an exit sign detection module configured to detect roadway exit signs, an exit sign analyzer configured to analyze characteristics of detected exit signs, and a lane identification module configured to identify and locate exit-only and shared exit lanes on a roadway, and shows that the lane identification system communicates with a navigation system and an autonomous driving system.

FIG. 2 shows a lane identification system 200 in accordance with the present disclosure. FIG. 2 shows that lane identification system 200 is provided on vehicle 110, which also includes navigation system 206 and autonomous driving system 208. Although navigation system 206 and autonomous driving system 208 are shown as separate from lane identification system 200, in other embodiments, either or both of navigation system 206 and autonomous driving system 208 may be provided as part of lane identification system 200.

Lane identification system 200 includes certain components for detecting and analyzing lane markings. These components include a lane marking data collector 202 for collecting data regarding lane markings on roadway 101, a first image processor 210 to prepare lane marking data for further processing and analysis, a lane marking detection module 212 to detect lane markings 132, 134, 136 in a roadway environment, and a lane marking categorization module 214 to categorize lane markings 132, 134, 136.

Lane identification system 200 also includes certain components for detecting and analyzing exit signs. These components include an exit sign data collector 204 for collecting data regarding exit signs on roadway 101, a second image processor 216 to prepare exit sign data for further processing and analysis, an exit sign detection module 218 to detect exit signs 140, 142 in a roadway environment, and an exit sign analyzer 220 to identify characteristic features of exit signs 140, 142, such as text and arrows.

Finally, lane identification system 200 includes a lane identification module 222 that identifies and locates exit-only and shared exit lanes. Lane identification module 222 accepts data from lane marking categorization module 214 and exit sign analyzer 220. Based on that data, lane identification module 222 identifies the presence and location of exit-only and shared exit lanes. The operation of lane identification module 222 will be discussed in more detail in connection with FIGS. 3A-B.

Lane marking data collector 202 may include one or more cameras capable of capturing image data within a field of view surrounding vehicle 110. Generally, the field of view of lane marking data collector 202 may be sufficient to capture image data for lane markings on roadway 101 in front of and peripheral to vehicle 110. Similarly, exit sign data collector 204 may include one or more cameras capable of capturing image data within a field of view surrounding vehicle 110. Generally, the field of view of exit sign data collector 204 may be sufficient to capture image data for signs appearing in front of, above, and peripheral to vehicle 110. Although the illustrative embodiment of FIG. 1 depicts overhead exit signs 140, 142, it should be understood that the present disclosure is not limited to detection of overhead exit signs, and may also include detection and analysis of signage appearing roadside at or near street-level.

FIG. 2 shows lane marking data collector 202 and exit sign data collector 204 as separate components, but other embodiments may include a single data collector that captures both lane marking data and exit sign data. For example, FIGS. 4A-5C, to be described in more detail below, show exemplary image data from a single data collector that serves as both a lane marking data collector 202 and an exit sign data collector 204. Other embodiments may use cameras located at different positions. For example, the cameras may be mounted elsewhere on front hood of vehicle 110, on sides of vehicle 110, inside vehicle 110 mounted near its front windshield, or in any other location suitable for capturing image data of the proximity of vehicle 110. Still other embodiments may use other types of data collectors (e.g., radar or lidar) in addition to or as alternatives to cameras.

Data from lane marking data collector 202 is transmitted to first image processor 210. First image processor 210 may perform image pre-processing to facilitate lane marking detection and analysis. For example, first image processor 210 may extract frames of image data from lane marking data collector 202 and apply image processing filters to adjust and enhance image properties (e.g., brightness, contrast, edge enhancement, noise suppression, etc.). First image processor 210 may also perform perspective transformations, such that lane identification system 200 can analyze identified lane markings from a top-down, plan perspective, rather than from a front perspective. First image processor 210 then transmits pre-processed frames of image data to lane marking detection module 212.

Lane marking detection module 212 may detect and identify lane markings from within the pre-processed frames of image data. Generally, lane markings on roadways are often painted white, such that the pixel intensity for portions of the image data corresponding to lane markings may sharply differ from the pixel intensity of other portions of the image data. Such differences give rise to discontinuities, near-discontinuities, or sharp gradients in pixel intensity at locations in the image data corresponding to lane markings. This allows lane marking detection module 212 to identify candidate lane markings through a variety of techniques, including edge-detection techniques, ridge-detection techniques, or other feature extraction and identification methodologies.

Upon detection of candidate lane markings, lane marking detection module 212 can perform additional steps to determine whether candidate lane markings are actual lane markings rather than false positives. For example, lane marking detection module 212 can compute slopes of candidate lane markings to determine whether the slopes are consistent with what would be expected of actual lane markings, and can compare image data among several consecutive frames to determine whether the relative position of candidate lane markings among those frames is consistent with what would be expected of actual lane markings.

Figure 4A:
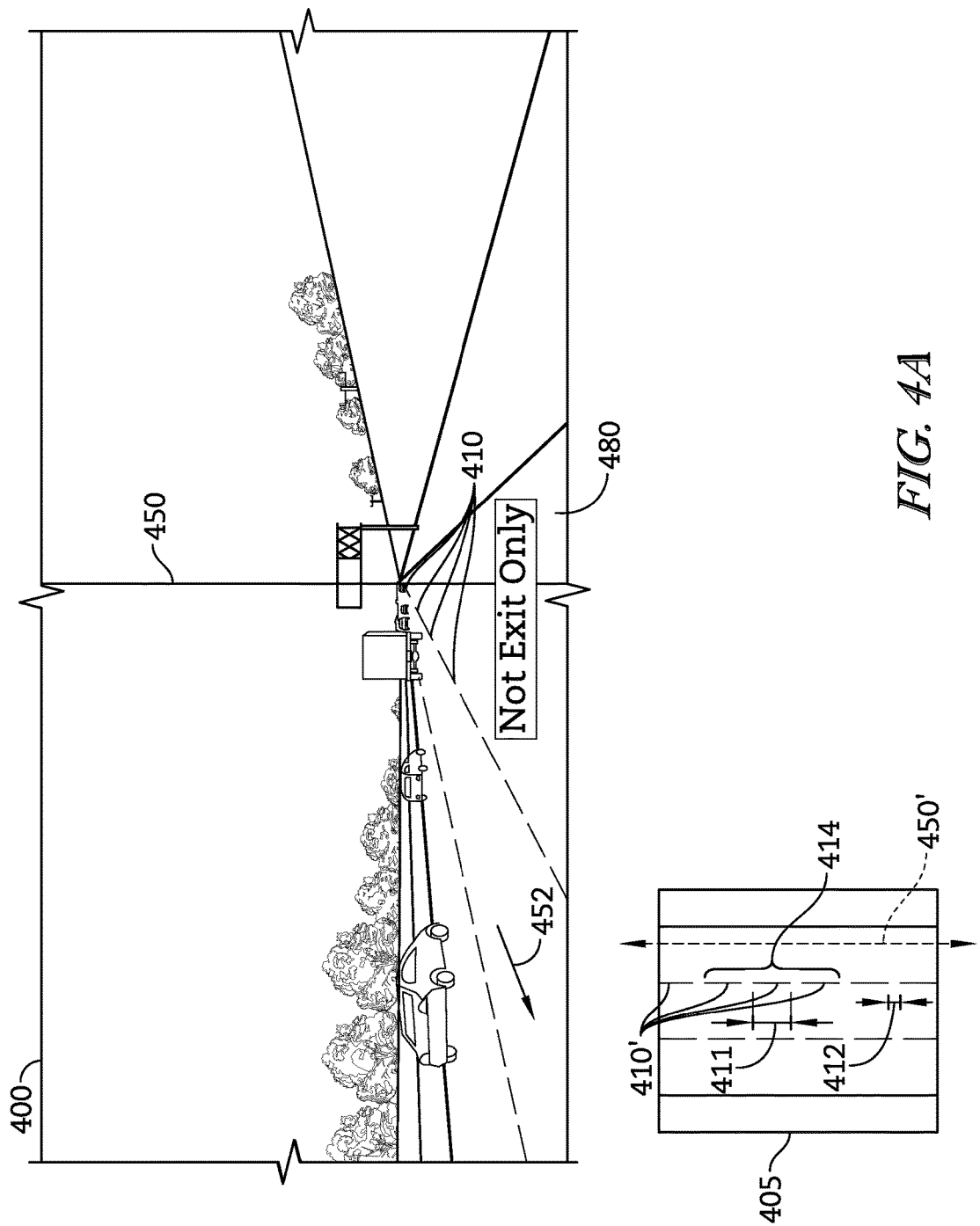
FIG. 4A shows exemplary image data captured by a lane identification system and an exemplary output of a lane marking detection module in accordance with the present disclosure, and suggests that the lane identification system has detected standard frequency lane markings on a left side of the vehicle.

FIG. 4A, to be discussed in more detail below, illustrates an exemplary result of the processing described above. In particular, FIG. 4A shows a frame of image data 400 captured by lane marking data collector 202, and retrieved by first image processor 210. FIG. 4A also shows an exemplary output 405 of lane marking detection module 212. As shown, captured frame of image data 400 includes lane markings 410, and output 405 from lane marking detection module 212 shows detected lane markings 410'.

Returning to FIG. 2, the detected lane markings are transmitted to lane marking categorization module 214. Lane marking categorization module 214 categorizes the detected lane markings based both on lane marking type and based on the side of vehicle 110 on which the detected lane markings appear. As explained in connection with FIG. 1, exemplary lane marking types include standard frequency, high frequency, and solid lane markings. Such lane markings may appear on a left side or a right side of vehicle 110.

To categorize detected lane markings based on lane marking type, lane marking categorization module 214 may compute and analyze lengths and/or frequencies of detected lane markings. For example, FIG. 4A shows detected lane markings 410', which are standard frequency lane markings. Lane marking categorization module 214 may determine pixel-based dash lengths 411 of each of the detected lane markings 410' and/or pixel-based gap lengths 412 of gaps between each of the detected lane markings 410'. Lane marking categorization module 214 may be pre-programmed with dash length or gap length thresholds. Lane marking categorization module 214 may determine that detected lane markings 410' are standard frequency if dash lengths 411 are above a predetermined length threshold, if gap lengths 412 are above a predetermined gap length threshold, or based on a combination of these assessments. Alternatively, lane marking categorization module 214 may assess a relative frequency of detected lane markings 410', such as how many detected lane markings 410' (i.e., how many dashes) exist within a predetermined range 414. If the determined relative frequency is below a predetermined frequency threshold, lane marking categorization module 214 may determine that detected lane markings 410' are standard frequency.

Figure 4B:
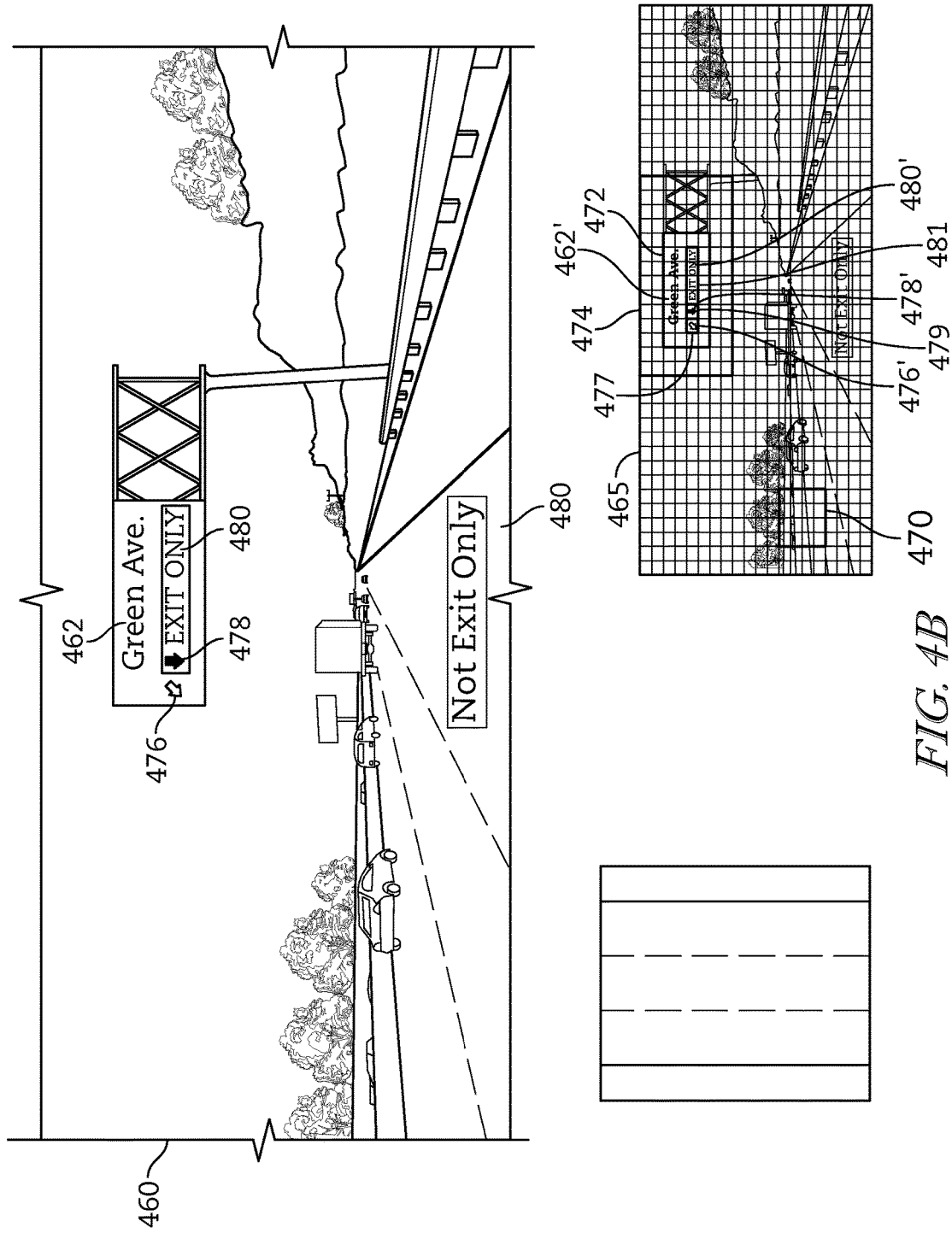
FIG. 4B shows exemplary image data captured by a lane identification system and an exemplary output of an exit sign analyzer in accordance with the present disclosure, and suggests that the lane identification system has detected an exit sign, as well as text and two arrows on the exit sign that indicate the presence of one exit-only lane and one shared exit lane.
Figure 4C:
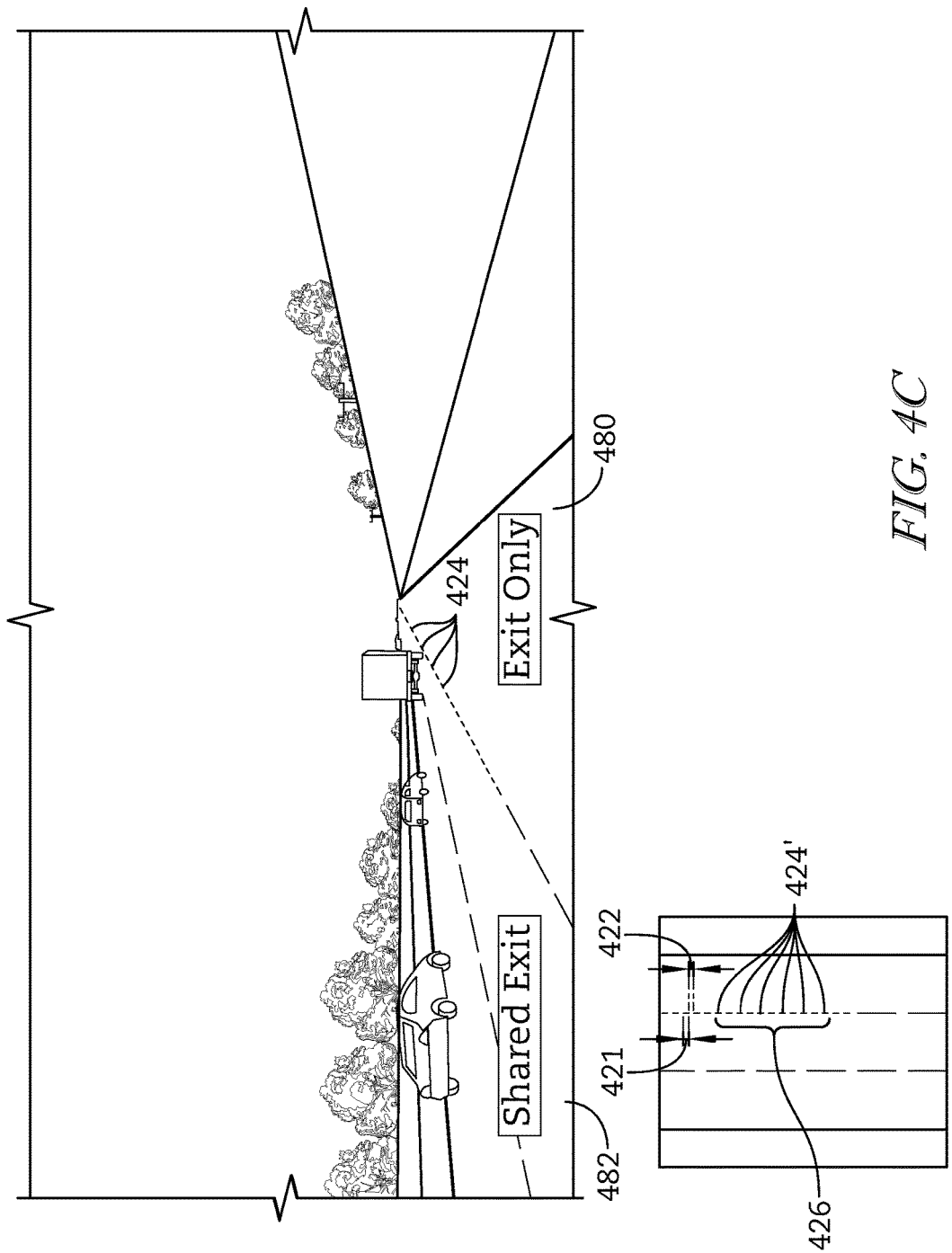
FIG. 4C shows exemplary image data captured by a lane identification system and an exemplary output of a lane marking detection module in accordance with the present disclosure, and suggests that the lane identification system has detected a transition in lane markings on the left side of the vehicle from standard frequency lane markings to high frequency lane markings, indicating that the presently occupied lane of the vehicle is an exit-only lane and the neighboring left lane of the vehicle is a shared exit lane.

FIG. 4C shows detected lane markings 424' that are high frequency. As illustrated, dash lengths 421 and gap lengths 422 of detected lane markings 424' are smaller as compared to detected lane markings 410' of FIG. 4A, and may fall below the above-referenced predetermined dash length and gap length thresholds. Also, the number of detected lane markings 424' (i.e., the number of dashes) within a predetermined range 426 may be higher than the above-referenced predetermined frequency threshold. Any one or more of these factors could be used by lane marking categorization module 214 to conclude that detected lane markings 424' are high frequency.

Figure 4D:
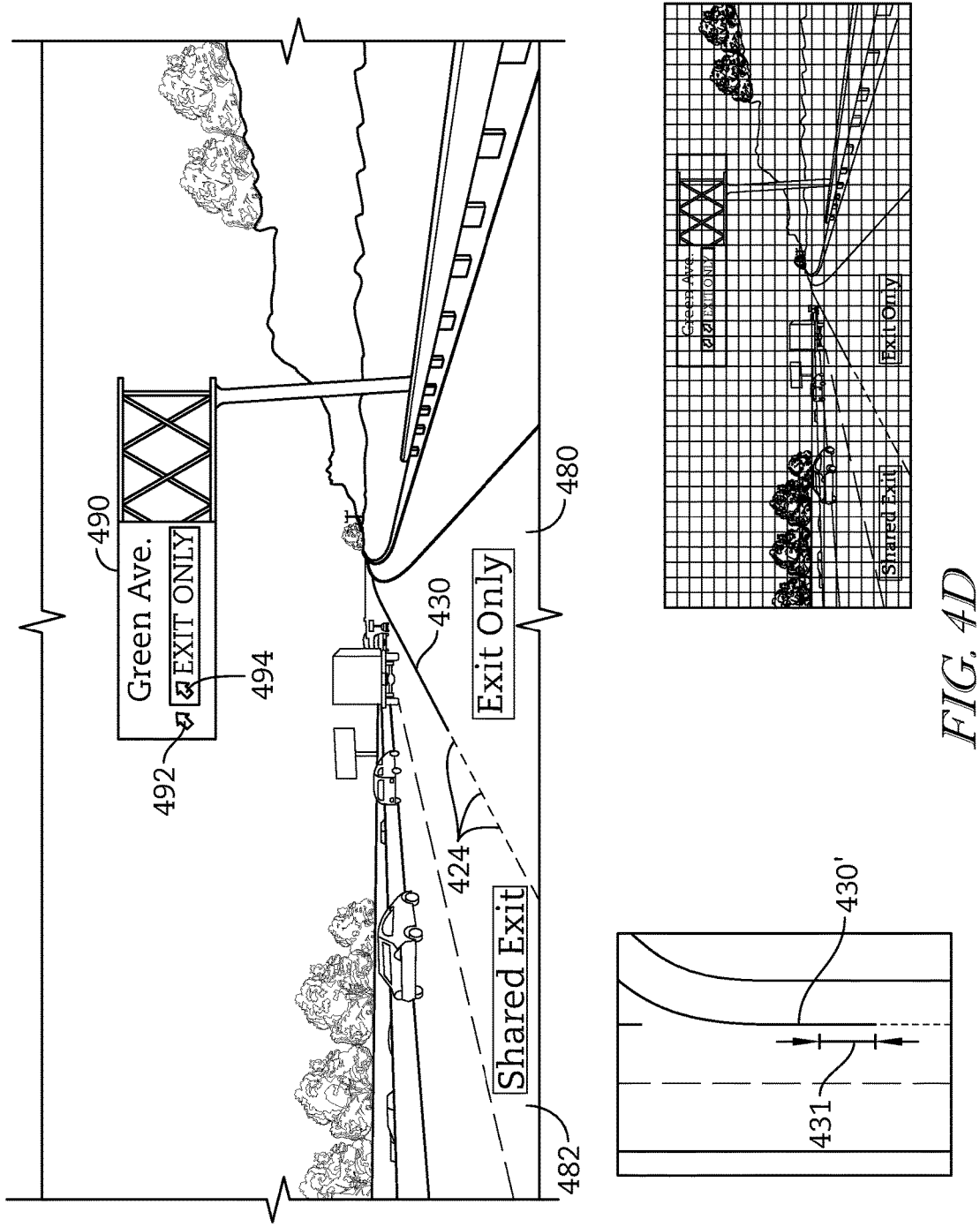
FIG. 4D shows exemplary image data captured by a lane identification system, an exemplary output of a lane marking detection module, and an exemplary output of an exit sign analyzer in accordance with the present disclosure, and suggests that the lane identification system has detected a transition in lane markings on the left side of the vehicle from high frequency lane markings to solid lane markings, and has also detected an exit sign that includes text and two arrows, which confirm that the presently occupied lane of the vehicle is exit-only and the neighboring left lane of the vehicle is shared.

FIG. 4D shows detected lane marking 430', which is a solid lane marking. Lane marking categorization module 214 may conclude that detected lane marking 430' is solid by assessing whether detected lane marking 430' proceeds beyond a predetermined length threshold 431 without a gap.

Thus, as explained, lane marking categorization module 214 categorizes detected lane markings based on type, which may include standard frequency, high frequency, and solid. These types are merely exemplary. Other roadway settings may use other types of lane markings to signify exits, exit-only lanes, or shared exit lanes. Lane marking categorization module 214 may be programmed to categorize detected lane markings into any categories appropriate for lane marking conventions of a given roadway setting. For example, lane marking categorization module 214 may be in communication with a database 213 that contains sample lane marking data organized based on category. Lane marking categorization module 214 may apply statistical comparison and classification techniques to categorize detected lane markings under analysis as belonging to one of the categories stored in database 213. By reconfiguring and reprogramming database 213 with different types of sample data associated with different categorization conventions, lane marking categorization module 214 can be purposed for any lane marking conventions being used in a given roadway setting.

Returning to FIG. 2, lane marking categorization module 214 also categorizes lane markings based on whether detected lane markings are on the left side or right side of vehicle 110. Such a determination may be made, for example, by forming an axis aligned with the directional orientation of vehicle 110. For example, FIG. 4A shows an axis 450 that aligns with the directional heading of vehicle 110. Lane marking categorization module 214 may overlay a corresponding axis 450' on output 405, determine that detected lane markings 410' are to the left of corresponding axis 450', and conclude that lane markings 410 are on a left side of vehicle 110.

Alternatively, lane marking categorization module 214 may determine whether detected lane markings are to the left or to the right of vehicle 110 based on trajectory analysis. As vehicle 110 progresses, detected lane markings will appear in differing locations in subsequent frames of captured image data. Lane marking categorization module 214 may recognize and track a given detected lane marking over the course of multiple frames using any suitable object tracking techniques (e.g., Kalman filtering). If a tracked lane marking trends down and towards the left over the course of subsequent captured frames of image data 400, as suggested by arrow 452 of FIG. 4A, lane marking categorization module 214 may conclude detected lane markings are to the left of vehicle 110. If detected lane markings trend down and towards the right over the course of subsequent captured frames of image data 400, lane marking categorization module 214 may conclude detected lane marking are to the right of vehicle 110.

Lane marking categorization module 214 then transmits the categorization of detected lane markings to lane identification module 222. In this illustrative example, the categorizations may include standard frequency lane markings on left side, standard frequency lane markings on right side, high frequency lane markings on left side, high frequency lane markings on right side, solid lane markings on left side, and solid lane markings on right side. Lane identification module 222 combines these categorizations with data received from exit sign analyzer 220 (to be discussed below) and determines the presence and location of exit-only and shared exit lanes (to be discussed below).

As explained, in addition to lane marking data, lane identification system 200 also collects and processes exit sign data. Second image processor 216, which may be the same or a different component than first image processor 210, retrieves captured frames of image data from exit sign data collector 204. Second image processor 216 may perform image pre-processing to facilitate exit sign detection and analysis, including to apply image processing filters to adjust and enhance image properties (e.g., brightness, contrast, edge enhancement, noise suppression, etc.) and/or perform perspective transformations. Second image processor 216 then transmits pre-processed frames of image data to exit sign detection module 218.

Exit sign detection module 218 detects exit signs within the pre-processed frames of image data using any suitable object detection, recognition, and classification methodology. For example, FIG. 4B shows an exemplary output 465 that depicts results of exit sign detection module 218. Output 465 is based on an exemplary frame of image data 460 that includes an exit sign 462. Exit sign detection module 218 may perform pixel-based segmentation of output 465 into subwindows, and perform object detection and recognition using subwindowing schemes, such as sliding window detection. By way of example, exit sign detection module 218 may iterate through a variety of subwindows of varying sizes and dimensions. For each subwindow, exit sign detection module 218 may perform classification to determine whether that subwindow contains an exit sign. The classification can be based on statistical object detection and recognition methodology. Sample data for the classification, including exemplary image data both containing exit signs and not containing exit signs, may be provided as part of a database 219. For each subwindow at hand, exit sign detection module 218 can perform a classification to form a conclusion regarding whether that subwindow has an exit sign.

FIG. 4B shows, by way of example, an exemplary subwindow 470 that does not contain an exit sign. Subwindow 472, however, was classified as containing a detected exit sign 462'. In certain implementations, exit sign detection module 218 may identify a subwindow, such as subwindow 474, as containing a detected exit sign 462' and perform additional processing to identify a smaller subwindow 472 containing detected exit sign 462', as to more accurately identify its location.

Once exit sign detection module 218 identifies detected exit sign 462', it transmits data for detected exit sign 462' to exit sign analyzer 220. Exit sign analyzer 220 performs additional analysis to detect characteristics of exit sign 462. Characteristics may include symbols, such as arrows or text appearing on exit sign 462. Exit sign analyzer 220 may use similar object detection, recognition, and classification techniques as used by exit sign recognition module 218, and database 219 may include additional sample data for this purpose.

In the example of FIG. 4B, exit sign analyzer 220 performs additional pixel-based segmentation and windowing of output 465 and consults database 219 to identify arrows 476, 478 and "EXIT ONLY" text 480. Database 219 may include sample image data of arrows and sample image data of "EXIT ONLY" text, against which exit sign analyzer 220 can perform statistical classification of various subwindows. As illustrated, exit sign analyzer 220 has identified subwindows 477 and 479 as containing detected arrows 476' and 478', respectively, and subwindow 481 as containing detected "EXIT ONLY" text 480'.

In addition to identifying arrows 476 and 478, exit sign analyzer 220 may also identify characteristics of arrows 476 and 478, including their orientation and color. As previously explained, arrow orientation may signify whether an exit is impending, and arrow color may signify whether corresponding lanes are exit-only or shared. To determine orientation, exit sign analyzer 220 may again use statistical object recognition and classification, for which purpose database 219 may include sample image data and corresponding classifications of arrows assuming the different configurations of interest (e.g., generally downwards pointing arrows, generally upwards pointing arrows, etc.). To determine color, exit sign analyzer 220 may analyze pixel-based intensities. In this illustrative embodiment, exit sign analyzer 220 solely determines whether a given arrow is black or white, such that monochrome intensity is sufficient. In other embodiments, exit sign analyzer 220 may analyze pixel-based intensity according to a color model (e.g., RGB, CMYK, etc.). In the example of FIG. 4B, arrows 476, 478 are detected as generally downwards pointing, arrow 476 is detected as white, and arrow 478 is detected as black.

Exit sign analyzer 220 transmits its analysis of detected exit signs to lane identification module 222. Exemplary information transmitted by exit sign analyzer 220 may include, for each detected exit sign, the number, color, orientation, and position of arrows of the detected exit sign, and the presence and position of "EXIT ONLY" text on the exit sign.

Figure 3A:
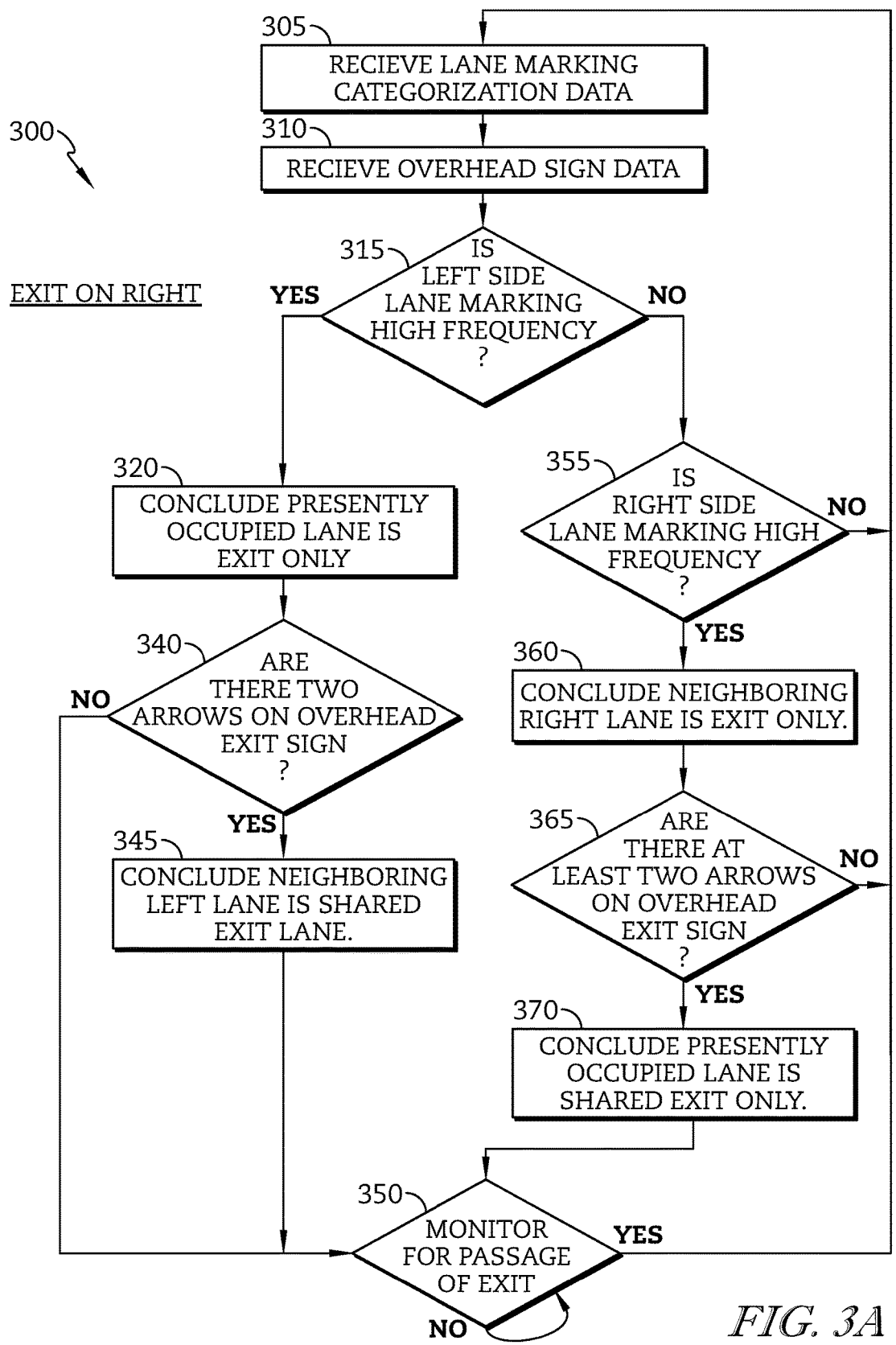
FIG. 3A is a flow diagram illustrating a methodology for operating a lane identification system in accordance with the present disclosure in which an exit departs a roadway on the right.

As explained, lane identification module 222 determines the existence and location of exit-only and shared exit lanes based on lane marking and exit sign data. FIG. 3A shows an exemplary method of operation 300 of lane identification module 222. The illustrated method of operation 300 applies where an exit departs from a roadway on the right. A modified method, to be explained below, may apply where an exit departs from a roadway on the left. Lane identification system 200 may receive an indication of which of these situations applies from navigation system 206, which may include GPS or other position tracking technology and notify lane identification system 200 that an exit is approaching, along with an indication of which side of the roadway the exit will depart from.

Alternatively, lane identification system 200 may determine which side of the roadway an exit will depart based on exit signs, with exit signs on a right side of a roadway suggesting an exit departing from the right, and exit signs on a left side of a roadway suggesting an exit departing from the left. Other possibilities include analysis of the orientation of arrows on detected exit signs, with arrows pointing towards the right suggesting that an exit will depart on the right and arrows pointing towards the left suggesting that an exit will depart on the left. As still another alternative, lane identification system 200 may use lane markings to determine which side of the roadway an exit will depart. Using the example of FIG. 1, lane identification system 200 of vehicle 110 may detect a solid lane marking 180 signifying a roadway boundary on a right side and detect lane markings for several lanes 104, 105, 106 on a left side. Lane identification system 200 may thereby conclude that lane 103 is on a right-hand side of roadway 101, and that exit 107 will therefore depart from the right.

The method of operation 300 begins with receiving operations 305, 310 in which lane identification module 222 receives lane marking categorizations from lane marking categorization module 214 and exit sign analysis from exit sign analyzer 220. In operation 315, lane identification module 222 determines whether high frequency lane markings are on the left side of vehicle 110. If so, lane identification module 222 proceeds to operation 320, in which it concludes that the presently occupied lane of vehicle 110 is exit-only.

Lane identification module 222 may then take one or more actions, depending on how lane identification system 200 is being used in vehicle 110. For example, lane identification module 222 may notify the driver of vehicle 110 that vehicle 110 is in an exit-only lane. If in an exit-only lane, the driver may wish to resume control of vehicle 110, and then at a later, desired time pass control back to autonomous driving system 208. Alternatively, lane identification module 222 may notify autonomous driving system 208 that vehicle 110 is in an exit-only lane. Autonomous driving system 208 may then take appropriate action. Autonomous driving system 208 may factor the notification from lane identification module 222 as it follows navigation instructions it receives from navigation system 206. Thus, based on whether navigation system 206 indicates that vehicle 110 should be taking an upcoming exit, autonomous driving system 208 may determine whether it should allow vehicle 110 to remain in its present exit-only lane, or change lanes to avoid taking an exit.

In addition to determining that the presently occupied lane is exit-only, lane identification module 222 also determines whether there exists a shared exit lane. In operation 340, lane identification module 222 determines whether received exit sign analysis indicates the presence of a shared exit. For example, if received exit sign analysis indicates there are two arrows on a detected exit sign, one black and one white, lane identification module 222 may conclude, based on the existence of a white arrow, that there is a shared exit lane. Additional examples for how lane identification module 222 may conclude whether there exists a shared exit lane will be discussed in connection with FIGS. 7A-F.

Lane identification module 222 may then proceed to operation 345, in which it concludes that the neighboring left lane of vehicle 110 is a shared exit. In response to such a conclusion, lane identification module 222 may take appropriate action, such as to notify autonomous driving system 208, which can factor this information into its driving decisions.

On the other hand, returning to operation 315, if lane identification module 222 determines that lane markings on the left side of vehicle 110 are not high frequency, then the presently occupied lane of vehicle 110 would not be exit-only. Lane identification module 222 may proceed to operation 355, in which it determines whether lane markings on the right side of vehicle 110 are high frequency. If not, then lane identification module 222 determines there are no upcoming exit-only or shared exit lanes, and returns to receiving operations 305, 310 to analyze subsequently received data.

If lane identification module 222 determines that lane markings on the right side of vehicle 110 are high frequency lane markings, it may proceed to operation 360, in which it concludes that a neighboring right lane of vehicle 110 is exit-only. Lane identification module 222 may then take appropriate action, such as to notify autonomous driving system 208. Autonomous driving system 208 may take appropriate action. For example, if navigation system 206 instructs autonomous driving system 208 to take the upcoming exit, autonomous driving system 208 may change into the neighboring exit-only lane.

Lane identification module 222 may proceed to check for the presence of a shared exit lane. In operation 365, lane identification module 222 determines whether received exit sign analysis indicates the presence of a shared exit. For example, if received exit sign analysis indicates there are two arrows on a detected exit sign, one black and one white, lane identification module 222 may conclude, based on the existence of a white arrow, that there is a shared exit lane. Additional examples for how lane identification module 222 may conclude whether there exists a shared exit lane will be discussed in connection with FIGS. 7A-F.

In operation 370, lane identification module 222 may conclude that the presently occupied lane of vehicle 110 is a shared exit lane. Lane identification module 222 may then take appropriate action, such as to notify the driver of vehicle 110 or to notify autonomous driving system 208. As explained, autonomous driving system 208 may provide the driver of vehicle 110 with the ability to assume control of vehicle 110. Alternatively, autonomous driving system 208 may determine whether staying in a shared exit lane is in accordance with instructions received from navigation system 206.

If lane identification module 222 identified any lane as an exit-only or shared exit lane, lane identification module 222 may proceed to monitoring operation 350, which monitors for the passage of an exit. Once an exit passes, then the prior identifications of exit-only or shared exit lanes would become obsolete, and lane identification module 222 returns to receiving operations 305, 310 to analyze subsequently received data. Lane identification module 222 may determine that an exit passes through a number of alternative approaches. In one example, lane identification module 222 may use exit sign analysis, with signs having a generally upwards orientation of arrows indicating that an exit is imminently passing. Lane identification module 222 may also determine that an exit passes through lane marking analysis. For example, when lane markings return to standard frequency, lane identification module 222 may conclude that an exit has passed.

Other methodologies for detecting exits through lane markings are discussed in U.S. patent application Ser. No. 14/520,804, entitled ACCURATE POSITION DETERMINATION NEAR EXIT LANES, filed on Oct. 22, 2014, which is hereby incorporated by reference in its entirety.

In exemplary operations not depicted in FIG. 3A, lane identification module 222 may confirm the accuracy of any of its determinations with additional operations. For example, lane identification module 222 may await information from lane marking categorization module 214 indicating a transition from high frequency lane markings to solid lane markings, which would indicate that an exit is impending and may confirm prior determinations of the presence of an exit-only lane. As another example, lane identification module 222 may receive exit sign data from exit sign analyzer 220 indicating the presence of a sign containing exit arrows or "EXIT ONLY" text, which may also confirm prior determinations of the presence of an exit-only lane.

As explained, the exemplary method of operation 300 depicted in FIG. 3A applies to the situation in which an approaching exit departs a roadway on the right side of the roadway. Lane identification system 200 may instead operate in the situation where an exit departs on the left. The methodology for such a circumstance would be similar, but with adjustments to certain operations reflecting that conclusions drawn based on the side of the vehicle on which characteristic lane markings were detected should be flipped.

Figure 3B:
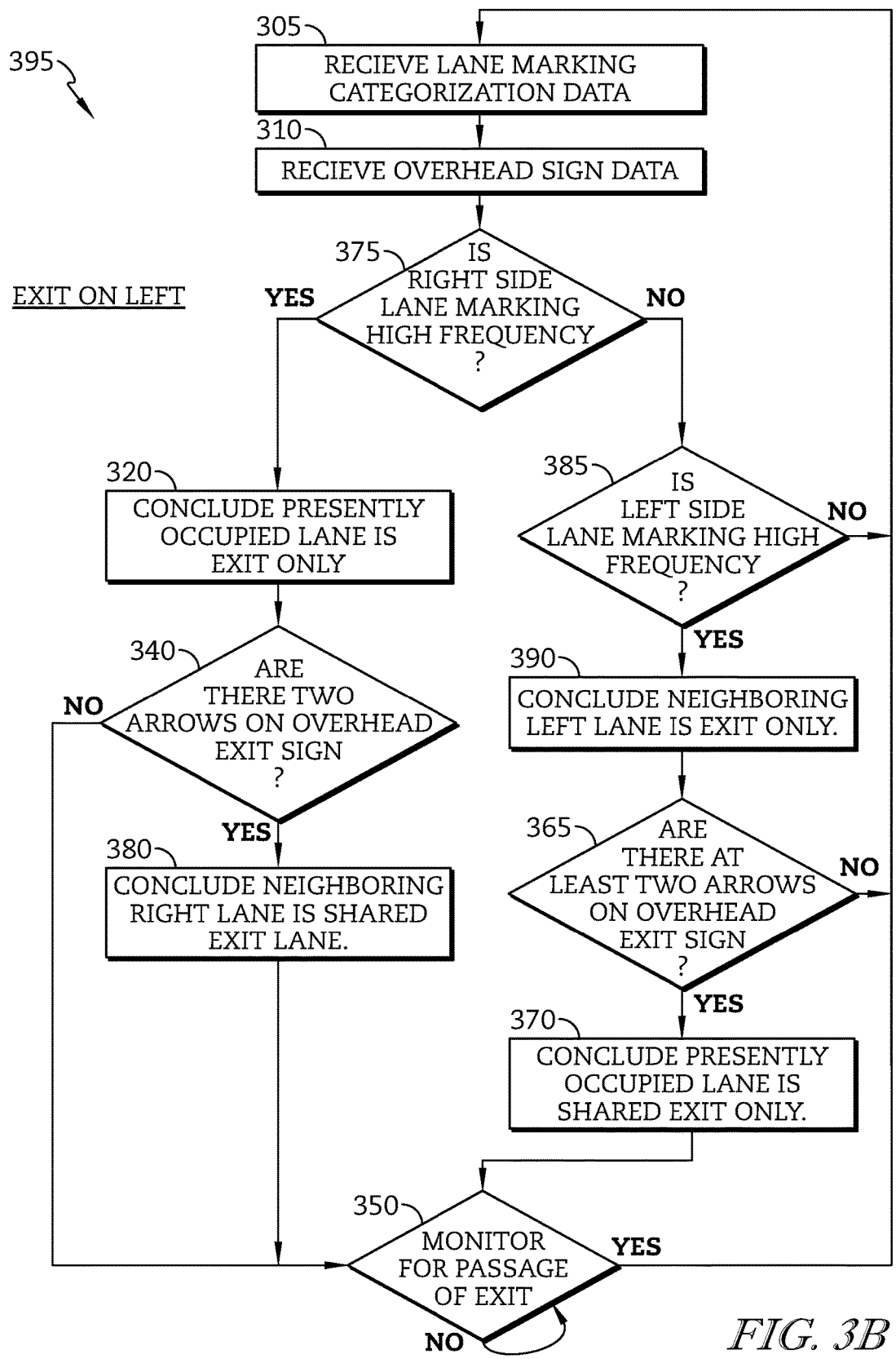
FIG. 3B is a flow diagram illustrating a methodology for operating a lane identification system in accordance with the present disclosure in which an exit departs a roadway on the left.

FIG. 3B illustrates a methodology 395 for operating a lane identification system in a situation in which an exit departs on the left. Many operations are similar to correspondingly numbered operations depicted in FIG. 3A. Operations 375, 380, 385, and 390, however, differ from corresponding operations depicted in FIG. 3A in that the relevant directional orientation used in decision-making has been switched, as appropriate for a situation in which an exit departs on the left.

FIGS. 4A-4D illustrate an exemplary usage scenario of lane identification system 200 for a vehicle traveling in an exit-only lane. In FIG. 4A, lane identification system 200 detects lane markings 410 as standard frequency, and concludes that presently occupied lane 480 is not exit-only. In FIG. 4B, lane identification system 200 detects lane markings 410 as standard frequency, and thus continues to conclude that presently occupied lane 480 is not exit-only. However, lane identification system 200 detects an exit sign 462 that includes two arrows 476, 478. Arrow 476 is analyzed to be white in color, while arrow 478 is analyzed to be black in color. This indicates to lane identification system 200 that an exit may be approaching, for which there may be an exit-only lane and a shared exit lane.

In FIG. 4C, lane identification system 200 detects high frequency lane markings 424 on the left side. In response to detecting high frequency lane markings 424 on the left side, lane identification system 200 concludes that presently occupied lane 480 is exit-only. Moreover, because lane identification system 200 previously identified an exit sign 462 indicating there would be both an exit-only lane and a shared exit lane, lane identification system 200 determines that neighboring left lane 482 is a shared exit.

In FIG. 4D, lane identification system 200 detects a transition from high frequency lane markings 424 to solid lane marking 430 on the left side, which may confirm that an exit is approaching and that presently occupied lane 480 is exit-only. In addition, lane identification system 200 detects an exit sign 490 with two arrows 492, 494, which may also confirm that an exit is approaching, and that presently occupied lane 480 is exit-only and that neighboring left lane 482 is a shared exit.

Figure 5A:
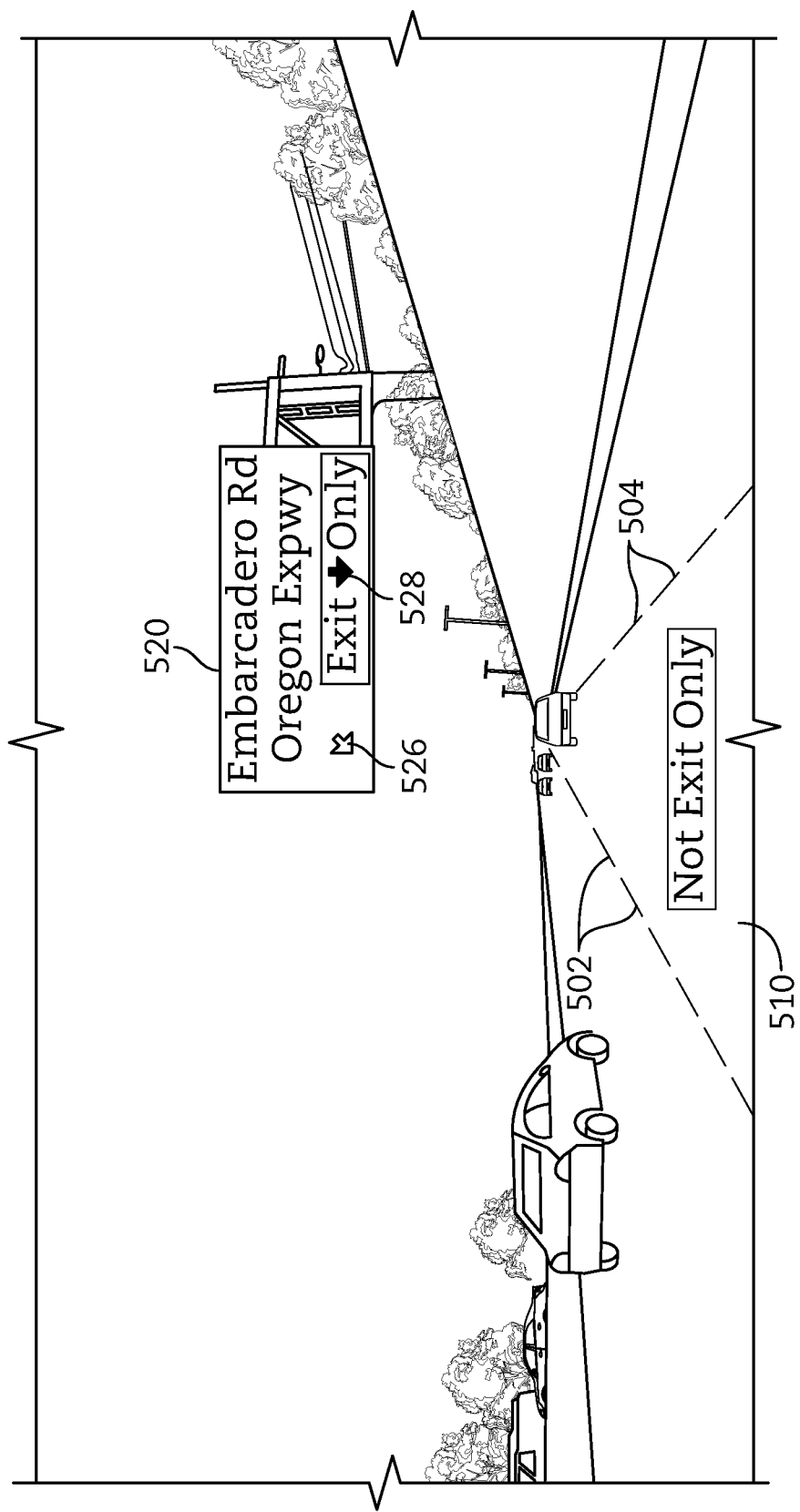
FIG. 5A shows exemplary image data captured by a lane identification system similar to that of FIG. 4A, except that the lane identification system is mounted on a vehicle in a shared exit lane, and suggests that the lane identification system has detected an exit sign that includes text and two arrows, indicating the presence of both an exit-only lane and a shared exit lane.
Figure 5B:
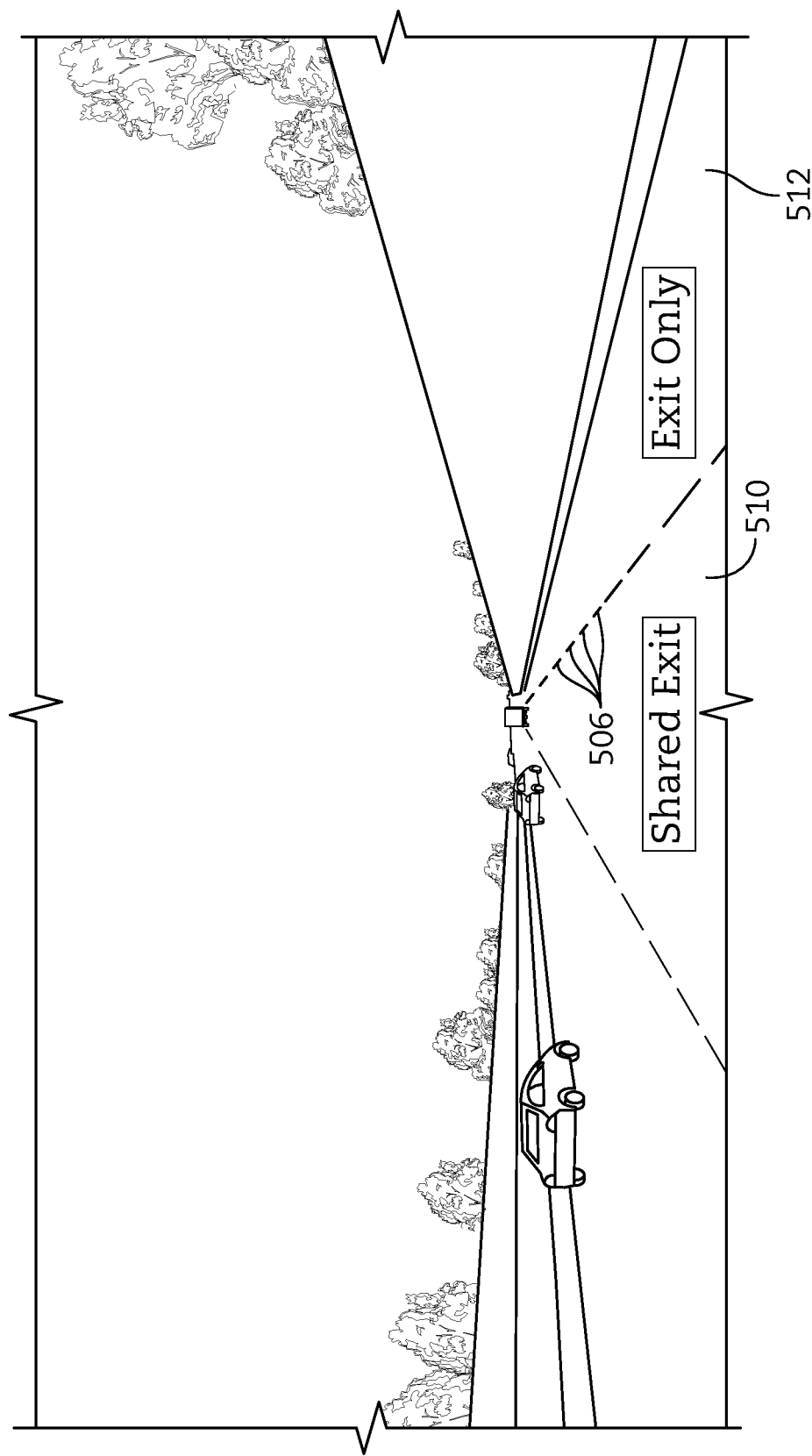
FIG. 5B shows exemplary image data captured by a lane identification system in accordance with the present disclosure, and suggests that the lane identification system has detected a transition in lane markings on the right side of the vehicle from standard frequency lane markings to high frequency lane markings, indicating that the neighboring right lane is an exit-only lane and the presently occupied lane is a shared exit lane.
Figure 5C:
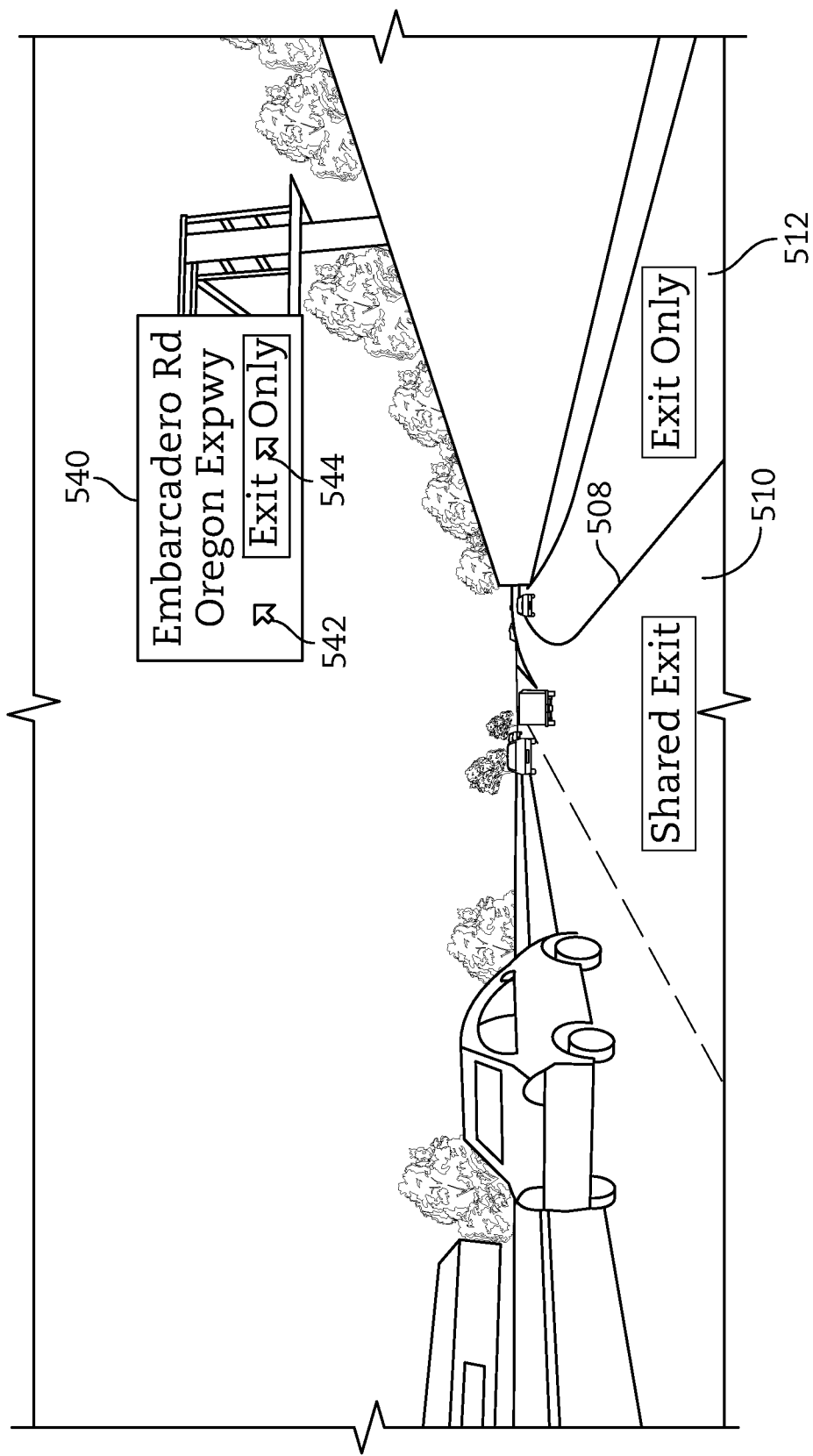
FIG. 5C shows exemplary image data captured by a lane identification system in accordance with the present disclosure, and suggests that the lane identification system has detected a transition in lane markings on the right side of the vehicle from high frequency lane markings to solid lane markings, and has also detected an exit sign including text and two arrows on the exit sign, which confirm that the neighboring right lane is an exit-only lane and the presently occupied lane of the vehicle is a shared exit lane.

FIGS. 5A-5C depict an exemplary usage scenario of lane identification system 200 for a vehicle that travels on a shared exit lane. In FIG. 5A, lane identification system 200 detects standard frequency lane markings 502, 504 on left and right sides. In response, lane identification system 200 determines that presently occupied lane 510 is not exit-only. In addition, lane identification system 200 detects an exit sign 520 with two arrows 526, 528. Arrow 526 is analyzed to be white in color, while arrow 528 is analyzed to be black in color. This indicates to lane identification system 200 that an exit may be approaching, for which there may be an exit-only lane and a shared exit lane.

In FIG. 5B, lane identification system 200 detects high frequency lane markings 506 on the right, indicating that neighboring right lane 512 is exit-only. In addition, because lane identification system 200 previously detected exit sign 520 as indicating there would be both an exit-only lane and a shared exit lane, lane identification system 200 determines that presently occupied lane 510 is a shared exit. In FIG. 5C, lane identification system 200 detects a transition from high frequency lane markings 506 on the right to solid lane markings 508 on the right. Lane identification system 200 further detects exit sign 540 with two arrows 542, 544. These detections may confirm that an exit is impending, that neighboring right lane 512 is exit-only, and that presently occupied lane 510 is a shared exit.

As explained, a benefit of lane identification system 200 is that determinations of exit-only lanes and shared lanes may be communicated to autonomous driving system 208 to improve autonomous driving performance. FIGS. 6A-B illustrate an exemplary benefit of notifying autonomous driving system 208 that a presently occupied lane is a shared exit. FIG. 6A shows a roadway 600 with an exit 660, on which a vehicle 610 occupies a lane 602. Vehicle 610 is equipped with an autonomous driving system (not pictured), but is not equipped with lane identification system 200.

The autonomous driving system maintains vehicle 610 within lane 602 by centering vehicle 610 between left side and right side lane markings 606, 608. However, lane 602 is a shared exit, meaning its right side lane marking 608 will diverge and exit from roadway 600. Vehicle 610 is not equipped with lane identification system 200, meaning its autonomous driving system is not aware that lane 602 is a shared exit. As such, it continues to center vehicle 610 between left side and right side lane markings 606, 608. Vehicle 610 begins to drift towards the right, and may fall off the roadway 600 or crash into median 614.

FIG. 6B, in contrast, shows a vehicle 650 equipped with lane identification system 200. Lane identification system 200 identifies lane 602 as a shared exit, and detects transition 616 where right side lane marking 608 changes from high frequency to solid, indicating that an exit is impending. Lane identification system 200 may notify autonomous driving system 208 that lane 602 is a shared exit and that an exit is impending. In response, autonomous driving system 208 may ignore right side lane marking 608. Instead, autonomous driving system 208 may seek to maintain a fixed position relative solely to left side lane marking 606. Upon passage of the exit 660, autonomous driving system 208 may continue positioning vehicle 650 based on both left side and right side lane markings 606, 608.

As explained, lane identification system 200 may analyze detected exit signs for characteristics indicating the presence of exit-only and shared exit lanes. A variety of exit signs with respective types of characteristics are within the scope of the present disclosure. Generally, the types of exit signs, the characteristics of exit signs, and the meaning of those characteristics may vary based on signage conventions used in any given roadway setting. Lane identification system 200 may be configured to recognize and interpret any such exit signs.

Figures 7A, 7B:
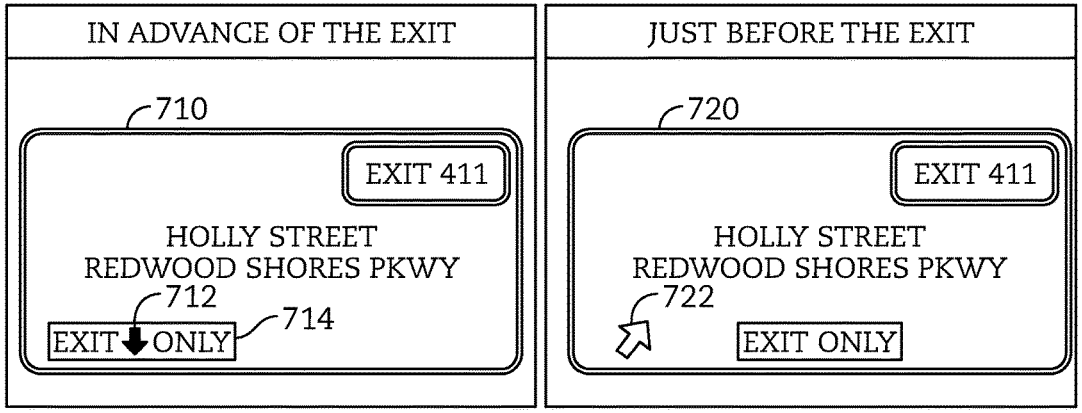
FIGS. 7A-B show exit signs that can be detected by a lane identification system in accordance with the present disclosure having characteristics by which the lane identification system may identify one exit-only lane.

FIGS. 7A-F show additional examples of exit signs that may be analyzed by lane identification system 200 in accordance with the present disclosure. FIG. 7A shows an exit sign 710 that may appear in advance of an exit, such as approximately half a mile before an exit. Exit sign 710 includes only one arrow 712, which is black in color and appears within "EXIT ONLY" text box 714. Lane identification system 200 may analyze exit sign 710 to determine that an exit is approaching for which there will be one exit-only lane, and no shared exit lanes. Lane identification system 200 may determine there will be one exit-only lane because there is only one arrow 712, because arrow 712 is colored black, and/or because arrow 712 is located within "EXIT ONLY" text box 714.

FIG. 7B shows an exit sign 720 that corresponds to the same exit as exit sign 710, but that appears immediately before the exit. Exit sign 720 includes only one arrow 722, from which lane identification system 200 may confirm that there is one exit-only lane and no shared exit lanes. Moreover, arrow 722 is rotated upwards and to the right, from which lane identification system 200 may confirm that an exit is impending.

Figures 7C, 7D:
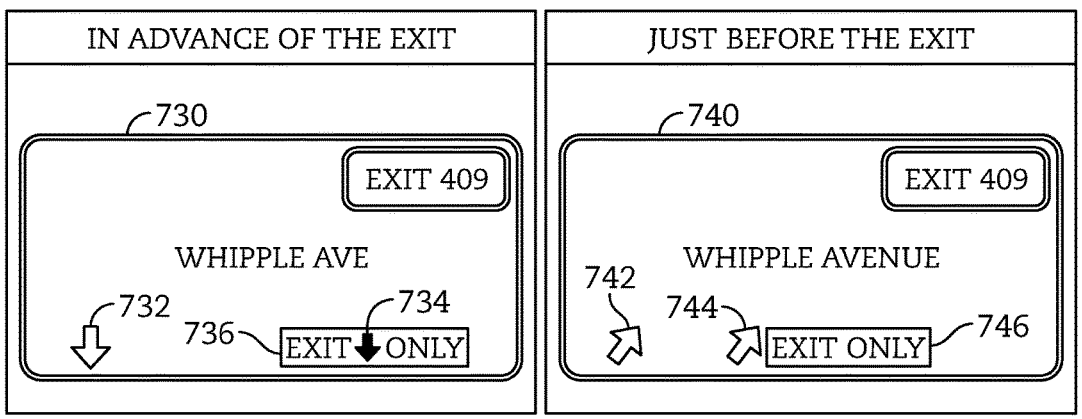
FIGS. 7C-D show exit signs that can be detected by a lane identification system in accordance with the present disclosure having characteristics by which the lane identification system may identify one exit-only lane and one shared exit lane.

FIG. 7C shows an alternative exit sign 730 with two arrows 732, 734 that may appear in advance of an exit, such as approximately half a mile before an exit. Arrow 732 is white in color, while arrow 734 is black in color and located within "EXIT ONLY" text box 736. Lane identification system 200 may analyze exit sign 730 and determine that an exit is approaching for which there will be one exit-only lane and one shared exit lane. Lane identification system 200 may determine there will be one exit-only lane because there is only one arrow 734 that is colored black and/or because there is only one arrow 734 located within "EXIT ONLY" text box 736. Lane identification system 200 may determine there will be one shared exit lane because there is only one arrow 732 that is white in color.

FIG. 7D shows an exit sign 740 that corresponds to the same exit as exit sign 730, but that appears immediately before the exit. Exit sign 740 includes two arrows 742, 744. Arrows 742 and 744 are rotated upwards and to the right, from which lane identification system 200 may confirm that an exit is impending. Moreover, lane identification system 200 may confirm that there is one exit-only lane and one shared exit lane because there are two arrows 742, 744, and only one arrow 744 is located near "EXIT ONLY" text box 746.

Figures 7E, 7F:
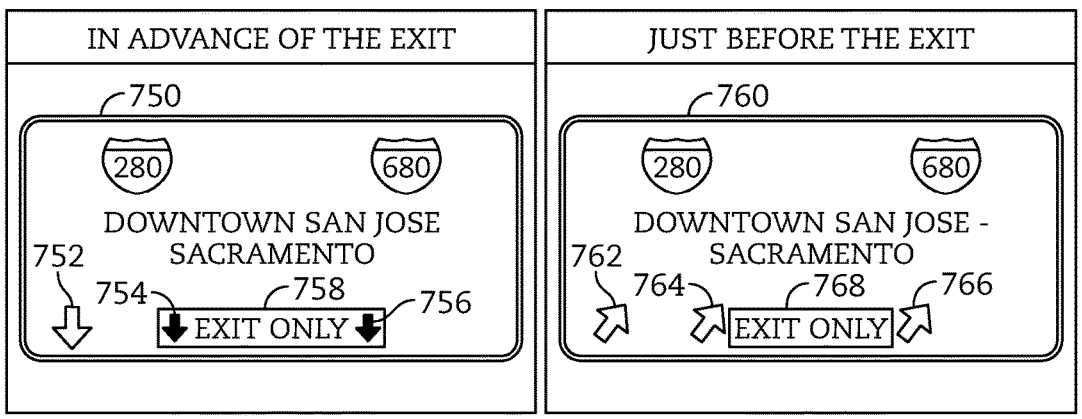
FIGS. 7E-F show exit signs that can be detected by a lane identification system in accordance with the present disclosure having characteristics by which the lane identification system may identify two exit-only lanes and one shared exit lane.

FIG. 7E shows an alternative exit sign 750 with three arrows 752, 754, 756 that may appear in advance of an exit, such as approximately half a mile before an exit. Arrow 752 is white in color, while arrows 754, 756 are black in color and located within "EXIT ONLY" text box 758. Lane identification system 200 may analyze exit sign 750 and determine that an exit is approaching for which there will be two exit-only lanes and one shared exit lane. Lane identification system 200 may determine there will be two exit-only lanes because there are two arrows 754, 756 that are colored black and/or because there are two arrows 754, 756 that are and located within "EXIT ONLY" text box 758. Lane identification system 200 may determine there will be one shared exit lane because there is only one arrow 752 that is white in color.

FIG. 7F shows an exit sign 760 that corresponds to the same exit as exit sign 750, but that appears immediately before the exit. Exit sign 760 includes three arrows 762, 764, 766. Arrows 762, 764, and 766 are rotated upwards and to the right, from which lane identification system 200 may confirm that an exit is impending. Moreover, lane identification system 200 may confirm that there are two exit-only lanes and one shared exit lane because two arrows 764, 766 are located near "EXIT ONLY" text box 768, while one arrow 762 is not.

Thus, lane identification system 200 can determine the existence of exit-only and shared exit lanes in a variety of roadway configurations, including situations involving multiple exit-only lanes.

The above-described components, including the first image processor 210, the second image processor 216, the lane marking detection module, the lane marking categorization module, the exit sign detection module 218, the exit sign analyzer 220, and the lane identification module 222 may be implemented in software, compiled and stored to a memory as object code, and during operation of the vehicle, may be invoked for execution by a processor. In one implementation, the above-described components are implemented as a single system on a chip. The interconnections among the above-described components can be provided through any suitable electronic communication mechanism, such as a communication bus. Alternatively, the lane identification system 200 may be provided on a common hardware platform as the navigation system 206 and/or the autonomous driving system 208. Thus, the lane identification system 200, the navigation system 206, and the autonomous driving system 208 may be implemented as software complied into object code on one or more memories that, during runtime, are invoked for execution by a processor, such that all systems are provided in a common chip package. Where the lane identification system 200, the navigation system 206, and the autonomous driving system 208 are provided in separate hardware modules, they may communicate with one another through any suitable electronic communication mechanism, such as a communication bus.

Whether implemented as one chip module or multiple chip modules, the lane identification system 200, the navigation system 206, and the autonomous driving system 208 may be provided in any convenient location in the vehicles 110, 120, such as behind a dashboard near other electronic circuitry. Such a location may be beneficial for providing convenient access to a power source, and to the electronic systems controlling the vehicle's driving.

The databases 213, 219 may be implemented using any known database environment, such as Oracle, DB2, or SQL Server.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for identifying exit-only lanes and shared exit lanes on a roadway, the system comprising:
   a first camera for obtaining image data regarding lane markings on the roadway; a second camera for obtaining image data regarding exit signs;
   a lane marking detection module for detecting lane markings on the roadway; an exit sign detection module for detecting exit signs;
   an exit sign analyzer for detecting arrows on the detected exit signs; and
   a processor and a non-transitory data storage on which is stored computer code which, when executed on the processor, causes the in-vehicle system to categorize detected lane markings as one of standard frequency dashed lane markings, high frequency dashed lane markings, and solid lane markings and for identifying an exit-only lane and a shared exit lane in response to the categorizations of the detected lane markings and characteristics of the detected arrows.

2. The in-vehicle system of claim 1, wherein when approaching an exit that departs on a right side of the roadway, the in-vehicle system:
   identifies a neighboring right lane as the exit-only lane in response to high frequency dashed lane markings being detected on a right side of a vehicle, and
   identifies a presently occupied lane as the exit-only lane in response to high frequency dashed lane markings being detected on a left side of the vehicle.

3. The in-vehicle system of claim 2, wherein the in-vehicle system determines a location of the shared exit lane based on whether the high frequency dashed lane markings are detected on the right side of the vehicle or the left side of the vehicle.

4. The in-vehicle system of claim 1, wherein the in-vehicle system identifies the shared exit lane in response to detecting two arrows corresponding to two respective lanes on one of the detected exit signs.

5. The in-vehicle system of claim 1, wherein the system engages an in-vehicle autonomous vehicle system to assume control of a vehicle based on the identified lane markings, and causes the autonomous vehicle system to maintain the autonomous vehicle in lane,
  wherein the in-vehicle system also identifies lane types on the roadway,
  wherein the processor and non-transitory data storage on which store computer code which, when executed on the processor, cause the in-vehicle system to:
  identify the exit-only lane in response to detecting lane markings on a side of the vehicle characteristic of exit-only lanes; and
  determine whether the identified exit-only lane is a presently occupied lane or a neighboring lane based on the side of the vehicle on which the characteristic lane markings are detected.

6. The in-vehicle system of claim 5, wherein the in-vehicle autonomous vehicle system is configured to maintain the vehicle in a lane on the roadway without taking an exit, wherein in response to a determination that the presently occupied lane is a shared exit lane, the computer code, when executed on the processor, causes the system configured to maintain the vehicle in the lane to follow lane markings that stay on the roadway and to ignore lane markings that exit the roadway.

7. The in-vehicle system of claim 5, wherein the computer code, when executed on the processor, causes the in-vehicle system to:
  receive an indication that an exit is approaching on either a left side or a right side of the vehicle;
  in response to receiving the indication that an exit is approaching on the right side of the vehicle, determine that the identified exit-only lane is a neighboring right lane when the characteristic lane markings are detected on the right side of the vehicle, determine that the exit-only lane is the presently occupied lane when the characteristic lane markings are detected on the left side of the vehicle; and
  in response to receiving the indication that the exit is approaching on the left side of the vehicle, determine that the exit-only lane is a neighboring left lane when the characteristic lane markings are detected on the left side of the vehicle, and determine that the exit-only lane is the presently occupied lane when the characteristic lane markings are detected on the right side of the vehicle.

8. The in-vehicle system of claim 5, wherein the computer code, when executed on the processor, causes the in-vehicle system to issue a notification to a driver of the vehicle when the presently occupied lane is identified as the exit-only lane.

9. The in-vehicle system of claim 5, further comprising an autonomous driving system, wherein the computer code, when executed on the processor, prompts a driver with an option to assume control of the vehicle from the autonomous driving system.

10. The in-vehicle system of claim 5, further comprising a navigation system, wherein the computer code, when executed on the processor, causes the in-vehicle system to notify the navigation system when the presently occupied lane is identified as the exit-only lane.

* * * * *